Patented Mar. 28, 1950

2,502,376

UNITED STATES PATENT OFFICE 2,502,376

PROCESS FOR REMOVING INSECTS FROM EDIBLE VEGETABLES AND FRUITS

Charles B. Gnadinger, Edina, Minn., assignor to McLaughlin Gormley King Company, Minneapolis, Minn., a corporation of Minnesota No Drawing. Application December 9, 1948, Serial No. 64,421

3 Claims. (Cl. 99—103)

1

This invention relates to improved processes for removing insects from edible vegetables and fruits preparatory to the freezing, canning or marketing of such produce.

It is known that produce brought from the field and processed for freezing, canning or packaging for sale as fresh produce is infested to varying degrees with insects. The insects are of various types and are at various stages of maturity at the time the produce is processed. Despite the best cultural methods, which include the use of modern insecticides, insects exist on the produce and they continue to follow their natural life cycle, even after harvest. In so doing they continue to feed, breed, spin webs, burrow into the produce and attach themselves by mouth parts. In many stages of maturity the insects cannot be removed by any ordinary washing procedures.

It is an object of the present invention to provide an improved process of removing insects from produce and more particularly to provide methods whereby the insects are irritated sufficiently to cause them to loosen their hold on the produce or to crawl from their burrows, webs and places of security in the produce to position of vulnerability such that they can then be removed by ordinary washing.

It is a further object of the invention to provide an improved method of removing insects wherein the produce is subjected to an insect loosening material in liquid form and simultaneously subjected to vacuum and then the vacuum released while the produce is still immersed in the insect loosening material and the insects then washed from the produce.

It is a further object of the invention to provide a method of uniformly treating produce so as to provide insect irritation sufficient to cause the insects to loosen their holds and to crawl from their burrows, crevices, webs or other places of security, without, however, causing the insects to become moribund or dead.

Other and further objects of the invention are those inherent in the methods herein described and claimed.

In carrying out the invention there is provided a treating bath containing pyrethrins which are present partly in solution and partly in suspension in water in a concentration ranging from .0005% to .003%. For best results the treating bath should also contain a tasteless, odorless, non-toxic wetting agent, such as the polyoxyalkylene derivative of sorbitan monolaurate or monooleate. Aqueous mixtures containing pyrethrins in the foregoing concentrations are sufficient to cause agitation of insects with which they come in contact but are insufficient to cause the insects to become moribund or dead. It is undesirable to increase the pyrethrins content appreciably above .003% because if thus increased, at least certain types of insects will become moribund or will be killed and as a result the insects will die in their burrows or crevices or remain attached by mouth parts in a manner such that they are not vulnerable and removable by subsequent washing.

After the aqueous mixture of pyrethrins has been prepared the produce undergoing treatment is submerged in the liquid and while submerged is subjected to a vacuum ranging from 1 to 700 mm. of mercury. Then while the produce is still submerged in the pyrethrins mixture, the vacuum is released. As an alternative procedure the produce is subjected to a vacuum of 1 to 700 mm. of mercury and is then submerged in the liquid by suitable mechanical means. The vacuum is then released. As a result of either of the foregoing treatments under vacuum followed by a release of vacuum, the air in the produce, which existed as air bubbles lying in the crevices of the produce or as air entrapped in burrows or pockets or under insect webs in the produce, is removed. When the vacuum is released and atmospheric pressure is again applied to the aqueous pyrethrins mixture in which the produce is submerged, the liquid is driven into all parts of the produce, including the burrows wherein the insects may be. As a result all insects are wetted by the pyrethrins mixture.

As a result practically all of the insects in the produce are contacted at approximately the same time with approximately the same dosage of pyrethrins and as a result they are uniformly agitated and move, wiggle and crawl forth and loosen mouth parts from the produce, yet without becoming moribund or dead. Thereafter, the produce is removed from the pyrethrins mixture and is subjected to repeated washings, with simultaneous movement of the produce and by this means the insects are readily dislodged from the produce and carried away, thereby leaving the produce substantially free from insect infestation.

The processes of the invention may be carried out by the batch method or continuously. In either case the produce is submerged in an aqueous mixture containing .0005% to .003% pyrethrins and while the produce is submerged, air is removed by a suitable vacuum pump capable of producing a vacuum of 1 to 750 mm. of mercury pressure absolute. In the next step of the batch or continuous process the vacuum is released, that is to say, the pressure is equalized with atmospheric pressure, while the produce is still submerged. The produce is then removed and drained and the insects, which are activated by this treatment, are washed away with water, preferably by pressure spraying while the produce is rolled, turned or moved to varying positions. The total time during which the produce is subjected to the aqueous mixture of pyrethrins ranges from 1 to 15 minutes. After draining it is usually preferable to allow a few minutes time for the insects to react and crawl about as this facilitates the next step in which they are sprayed or flushed away.

As many apparently widely different embodiments of this invention may be made without departing from the spirit and scope thereof, it is to be understood that I do not limit myself to the specific embodiments herein.

What I claim is:

1. The method of treating produce for agitating insects thereon preparatory to removal of the insects by washing comprising subjecting the produce to an aqueous mixture containing .0005% to .003% pyrethrins and simultaneously subjecting said produce to a vacuum in the range of 1 to 700 mm. of mercury and then releasing the vacuum while the produce is submerged in the pyrethrins mixture.

2. A continuous process of treating produce for agitating insects thereon preparatory to removal thereof by washing which comprises continuously carrying the produce into and out of a treating zone and while in said zone submerging the produce in an aqueous mixture containing .0005% to .003% pyrethrins and simultaneously subjecting the produce to a vacuum in the range of 1 to 700 mm. of mercury and then while the produce is submerged in the aqueous mixture releasing the vacuum thereon and moving the produce from said treating zone.

3. The method of treating produce for agitating insects thereon preparatory to removal of the insects by washing comprising subjecting the produce to an aqueous mixture containing a polyoxyalkylene derivative of a sorbitan mono higher fatty acid ester and .0005% to .003% pyrethrins and simultaneously subjecting said produce to a vacuum in the range of 1 to 700 mm. of mercury and then releasing the vacuum while the produce is submerged in the pyrethrins mixture.

CHARLES B. GNADINGER.

REFERENCES CITED

The following references are of record in the file of this patent:

UNITED STATES PATENTS

| Number | Name | Date |
|---|---|---|
| 1,544,894 | Fransworth | July 7, 1925 |
| 1,890,475 | Todd | Dec. 13, 1932 |

OTHER REFERENCES

Chemistry and Industry, Aug. 1944, Article by West, pp. 290 to 294.